March 12, 1957 A. M. COMPTON 2,784,981
TANDEM AXLE ASSEMBLY HAVING STEERING MECHANISM
Filed April 11, 1955 4 Sheets-Sheet 1

INVENTOR.
Arthur M. Compton
BY
ATTORNEY

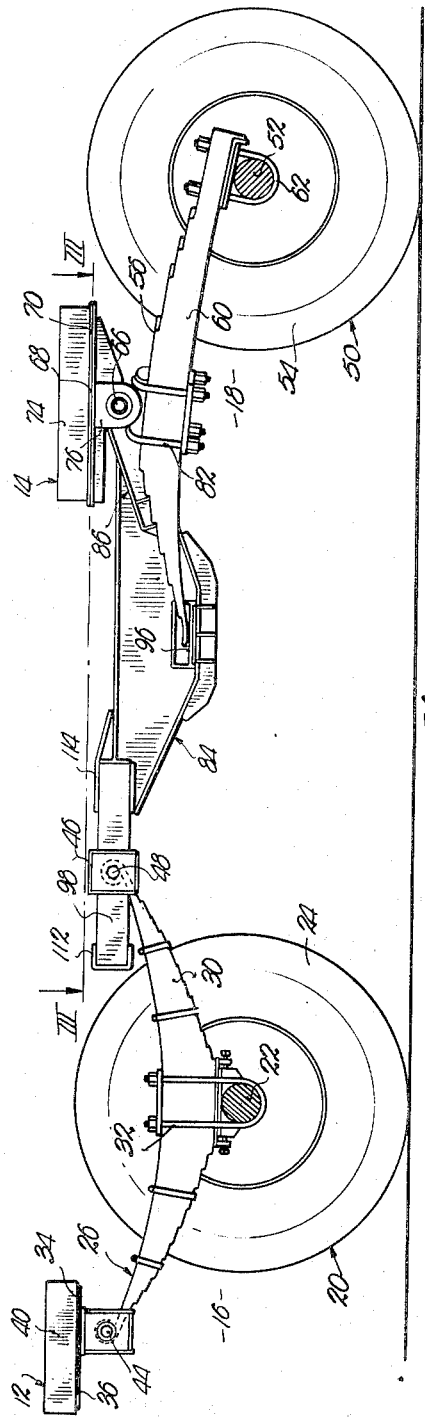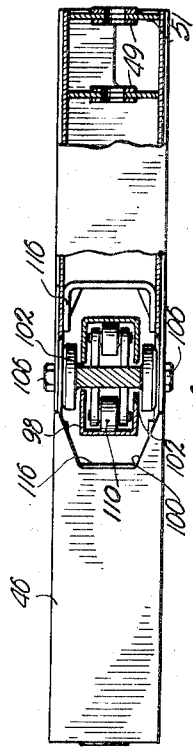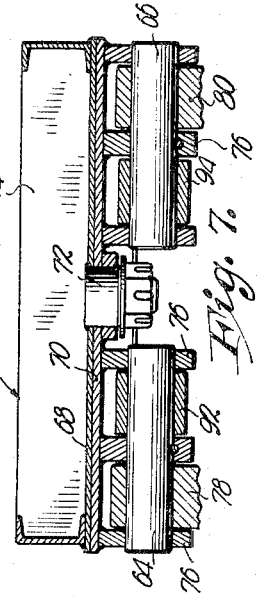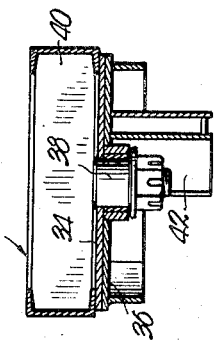
Fig. 2.
Fig. 5.
Fig. 7.
Fig. 6.
INVENTOR.
Arthur M. Compton
BY

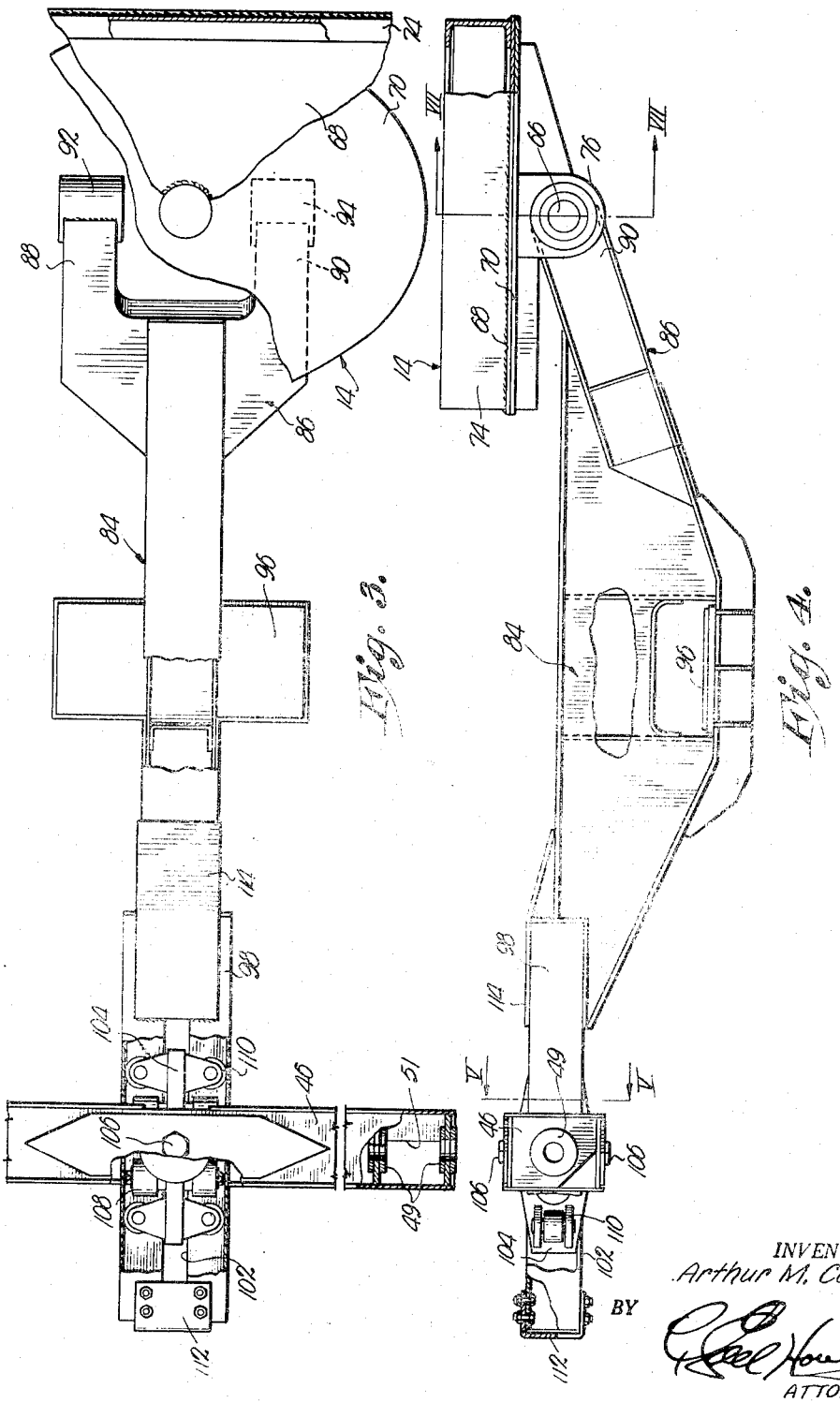

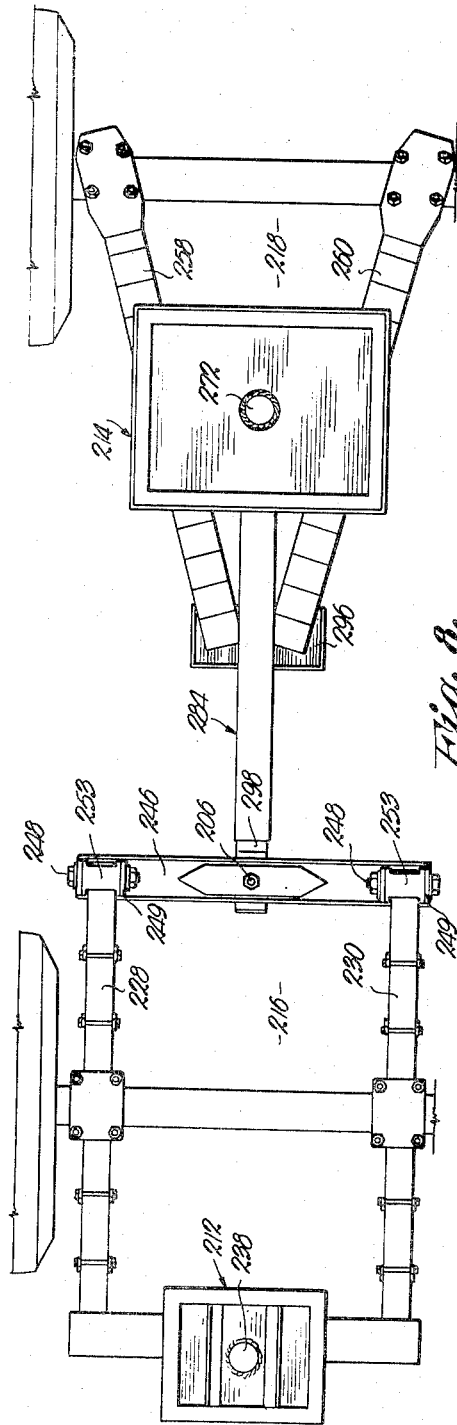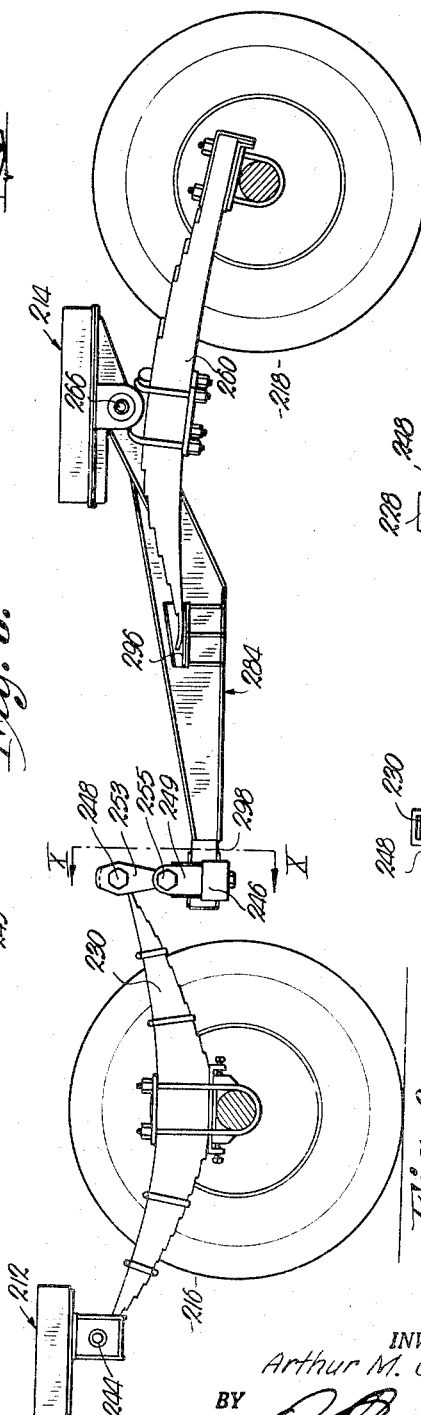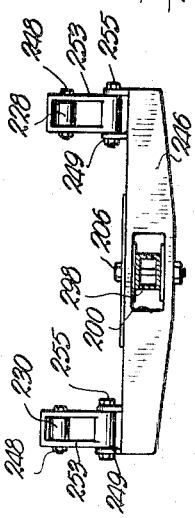

United States Patent Office 2,784,981
Patented Mar. 12, 1957

2,784,981

TANDEM AXLE ASSEMBLY HAVING STEERING MECHANISM

Arthur M. Compton, Bethel, Kans., assignor, by mesne assignments, to Standard Steel Works, Inc., North Kansas City, Mo., a corporation of Texas Application April 11, 1955, Serial No. 500,392

14 Claims. (Cl. 280—104.5)

This invention relates to improvements in mobile vehicles and particularly in the undercarriage thereof wherein is provided a pair of wheel and axle assemblies arranged in tandem, the primary object being to provide not only novel arrangement of parts and interconnections for the two assemblies in a manner to effect proper steering, but to at the same time, maintain equalization of loads on the two assemblies at all times.

It is the most important object of the present invention to provide an undercarriage of the aforementioned character wherein the two wheel and axle assemblies are both steerable thereby avoiding the tendency of skidding, particularly with respect to the forwardmost assembly.

It is common practice in designing undercarriages for trucks, trailers, semi-trailers and the like, to provide for steering in the rearmost wheel and axle assembly, but in so doing there is a tendency for the front tires to skid on slopes, causing the steerable rear assembly to rotate, thereby in turn tending to cause the rear end of the trailer to swing widely in the direction of the slope.

According to the principles of the instant invention, side moments are equalized whereby the tendency to skid is the same on both assemblies eliminating turning movement in the two assemblies on slopes.

Another important object of the present invention therefore, is to provide for the above equalization in side moments to which I have just above alluded while at the same time meeting the equally difficult problem of equalization of the loads on both axles through use of a novel spring arrangement and unique coupling thereof through a swingable beam and tie bar and fifth wheel structures strategically located so as to effect proper articulation throughout the undercarriage assembly.

Many additional objects to be made clear as the following specification progresses, include important details of construction and arrangement of parts, and reference is made to the accompanying drawings wherein:

Fig. 2 is a side elevational view thereof.

Fig. 3 is an enlarged, fragmentary, top plan view showing parts of the rear undercarriage and the manner of connection with the front undercarriage, parts being broken away for clearness.

Fig. 4 is a side elevational view of the structure shown in Fig. 3.

Fig. 5 is a cross-sectional view taken on line V—V of Fig. 4.

Fig. 6 is an enlarged, cross-sectional view taken on line VI—VI of Fig. 1.

Fig. 7 is a cross-sectional view taken on line VII—VII of Fig. 4.

Fig. 8 is a fragmentary, plan view of a modified form of tandem axle assembly made pursuant to my present invention.

Fig. 9 is a side elevational view of the embodiment shown in Fig. 8; and

Fig. 10 is a cross-sectional view taken on line X—X of Fig. 9.

Figure 1:
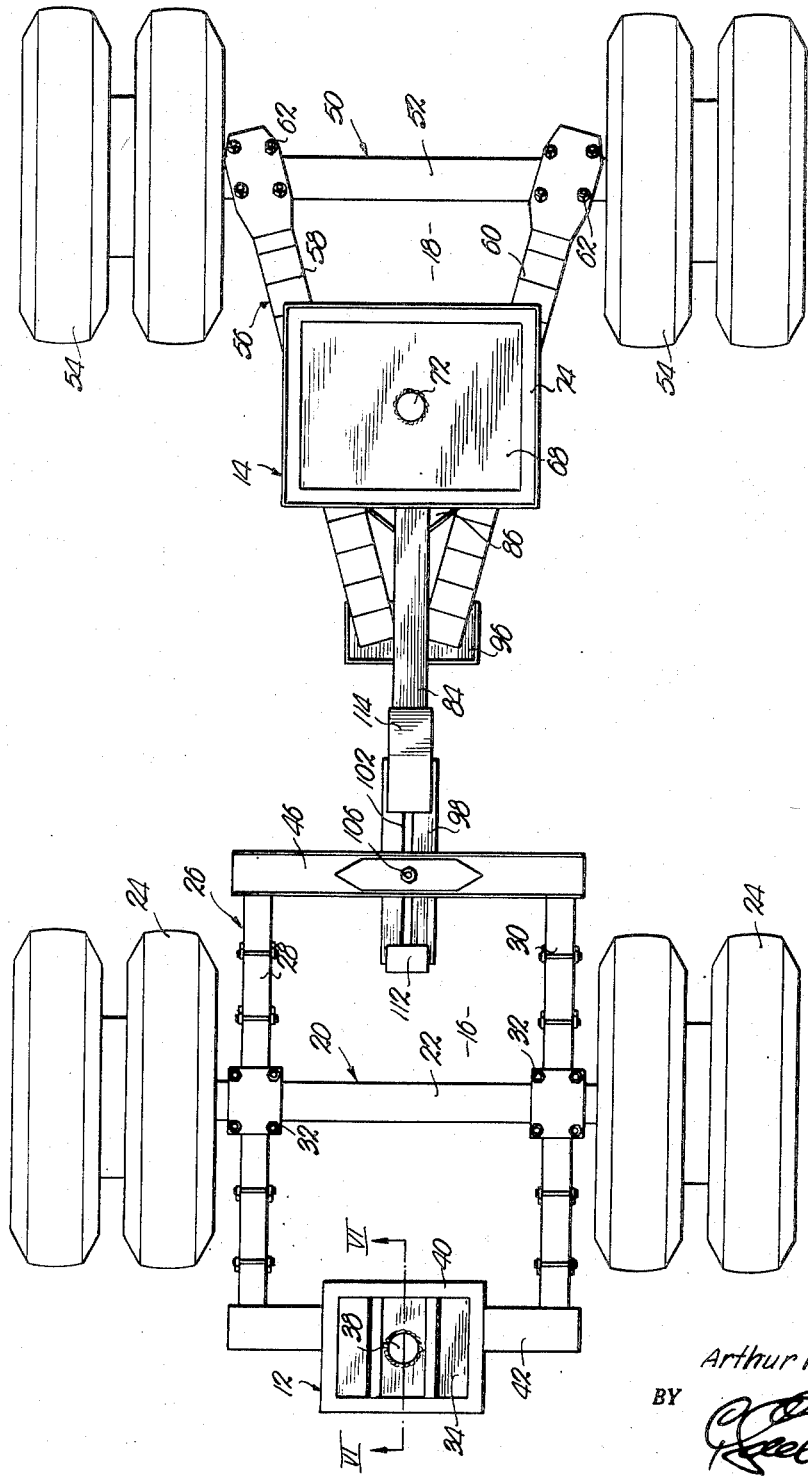
Figure 1 is a plan view of a tandem axle assembly having steering mechanism made according to one form of the instant invention.

While one or more wheel and axle assemblies connected in tandem have heretofore been mounted for swinging movement on vertical axes for steering purposes in trailers, trucks, semi-trailers and the like, in an effort to overcome tire skidding and to equalize side moments, so far as I am aware, such attempts have not been entirely satisfactory for the reason that in so doing, there has apparently been a total disregard of the necessity of maintaining equalized loads upon all of the assemblies.

It is most difficult to arrange the various spring units, the fifth wheel mounting structures and pivotal couplings between the series of wheel and axle assemblies so as to provide for proper steering and at the same time equalize the loads upon the axles as aforementioned. These difficulties are all overcome in the invention about to be described and attention is first called to the embodiment shown in Figs. 1 to 7 inclusive.

The trailer, truck, semi-trailer or the like with which the tandem axle assemblies of Figs. 1 to 7 inclusive are adapted to be used, has not been depicted in the drawings, but it is to be understood that the same is normally provided with a main frame that is operably coupled in any suitable manner with a front fifth wheel mounting structure 12, and a rear fifth wheel mounting structure 14. The two structures 12 and 14 form a part respectively of a front undercarriage broadly designated by the numeral 16 and a rear undercarriage broadly designated by the numeral 18.

The front undercarriage 16 includes a wheel and axle assembly 20, having an axle 22 and ground-engaging wheels 24. A spring unit 26 for the assembly 20, includes a pair of preferably parallel, longitudinally extending, downwardly bowed, semi-elliptical leaf spring stacks 28 and 30 bearing intermediate the ends thereof upon the axle 22.

The fifth wheel mounting structure 12 includes a pair of relatively rotatable, slidably interengaging plates 34 and 36 pivotally interconnected by vertical pin 38, the plate 34 having load carrying framework 40 for receiving the frame of the semi-trailer or the like. Suitable frame means fixed to the plate 36 and depending therefrom, includes a crossbar 42 interconnecting springs 28 and 30 at the forwardmost ends thereof by shackles having horizontal pivots 44 for swingably connecting the unit 26 with the structure 12. The assembly 20 may be connected to the plate 36 in any suitable manner such as by use of radius rods extending from axle 22, permitting springs 28—30 to slide on axle 22, but for purposes of simplifying this disclosure, there is shown a pair of U-bolts 32 for each spring 28—30, fixing the same to axle 22.

The rearmost ends of the springs 28 and 30 are similarly interconnected by a tie bar 46 and the unit 26 is shackled to the tie bar 46 through horizontal pintles 48 carried by bearings 49 (Figs. 3–5), the tie bar 46 having clearance openings 51 for the springs 28 and 30.

The rear undercarriage 18 includes a wheel and axle assembly 50 provided with an axle 52 and ground-engaging wheels 54. A spring unit 56 includes a pair of relatively diverging, longitudinally extending, upwardly bowed, semi-elliptical leaf spring stacks 58 and 60. The springs 58 and 60 rest at their rearmost, spaced-apart ends upon the axle 52 and are swingably coupled with the rear fifth wheel mounting structure 14 by horizontal stub shafts 64 and 66 respectively (Figs. 2 and 7). The structure 14 includes a pair of relatively rotatable, slidably interengaging plates 68 and 70 interconnected by the vertical pin 72, together with load carrying framework 74 for receiving the frame of a semi-trailer or the like. Here again, while U-bolts 62 are shown joining the springs 58 and 60 to axle 52, the assembly 50 could be joined to plate 70 by radius rods extending from axle 52, and the springs 58—60 permitted to merely slide on the axle 52. The use of radius rods in lieu of U-bolts for operably connecting axles 22 and 52 with their corresponding springs is well known in the art and need not be shown or further explained.

Stub shafts 64 and 66 are carried by perforated ears 76 rigid to, and depending from, the lowermost face of plate 70. Stub shafts 64 and 66 are also journaled in bearings 78 and 80 for springs 58 and 60 respectively, which bearings 78 and 80 are in turn clamped to the corresponding springs 58 and 60 intermediate the ends of the latter by U-bolts 82.

The rear undercarriage 18 is provided still further with a longitudinal, forwardly extending tie beam broadly designated by the numeral 84 for coupling the undercarriage 18 with the undercarriage 16. An upwardly and rearwardly extending section 86, forming a part of the beam 84 at the rearmost end thereof, is in the nature of a bifurcated yoke presenting a pair of spaced legs 88 and 90 (Fig. 3) having bearings 92 and 94 respectively journaled on stub shafts 64 and 66 as seen in Fig. 7.

Intermediate the ends of the tie beam 84 there is provided a transverse wear plate 96 which slidably receives the forwardmost ends of the springs 58 and 60 which rest thereon in the manner illustrated by Figs. 1 and 2 of the drawings.

A front section 98 forming a part of the beam 84 and extending forwardly therefrom is in the nature of an elongated, polygonal tube and extends freely through a central opening 100 formed in the tie bar 46 intermediate the ends thereof. The tube 98 is in turn provided with a longitudinal slot 102 for clearing a longitudinally extending bar 104 that is attached to the bar 46 in intersecting relationship thereto by opposed, vertical pintles 106.

A plurality of rollers 108 within the tube 98 and engaging the inner faces of the uppermost and lowermost walls thereof, are mounted on the sides of the bar 104 for rotation on horizontal axes. Similarly, there is provided a plurality of rollers 110 carried by the sides of the bar 104 for rotation on vertical axes and bearing against the inner faces of the sides of the tube 98, all as shown in Figs. 3–5 of the drawings. The extent of reciprocable movement of the tube 98 with respect to the tie bar 46 is limited by a forwardmost stop 112 mounted on the tube 98 and by the beam 84, as well as by a plate 114 at the rearmost end of the tube 98 or slot 102 serving as stops and engageable with the rearmost end of the bar 104 in the same manner as the stop 112 engages the forwardmost end of the bar 104. The extent of swinging movement of the undercarriage 18 with respect to the front undercarriage 16 about the vertical axis of pintles 106—106, is limited by U-shaped reinforcing stops 116 mounted within the bar 46 as seen in Fig. 5.

It is now clear that, by virtue of the provision of the fifth wheel mounting structures 12 and 14 for the front undercarriage 16 and the rear undercarriage 18 respectively, together with the provision of a coupling between the two undercarriages 16 and 18 that not only permits swinging movement of the undercarriage 18 with respect to the undercarriage 16 about the vertical axis of pintles 106—106, but which permits fore and aft movement of the undercarriage 18 relative to the undercarriage 16, all tendency of the rearmost undercarriage 18 to turn on slopes or under other conditions about the vertical axis of pin 72 for the structure 14, is translated to the front undercarriage 16 causing corresponding turning of the latter in like amount and in opposite direction about the vertical axis of the pin 38 for the structure 12. In other words, viewing Fig. 1, whenever the rear axle 52 turns in an anticlockwise direction out of parallelism with the front axle 22, the latter turns clockwise automatically and the two axles 22 and 52 diverge in one direction. Conversely, when the axle 52 turns clockwise, the axle 22 will turn anticlockwise and the two axles 22 and 52 will therefore, diverge in the opposite direction.

Such translation of turning moments from one undercarriage to the other in compensating amounts, minimizes tire scuffing under all road conditions not only in turns, but during straightforward movement notwithstanding unevenness of terrain and particularly under conditions wherein the roadbed slopes in one direction or the other transversely thereof.

Such turning movements of the undercarriages 16 and 18 about the vertical axes of pins 38 and 72 and pintles 106—106, as well as the necessary reciprocable movement of the beam 84 on its longitudinal axis with respect to tie bar 46, are not adversely affected by unevenness of terrain so far as bumps, holes and other rises and falls are concerned. Loads remain equalized upon the two assemblies 20 and 50 and the two spring units 26 and 56 flex freely and properly to cushion such load as swinging movements take place about the horizontal axes of pintles 44 and 48 and stub shafts 64 and 66, together with fore and aft sliding movement of the forwardmost ends of springs 58 and 60 on wear plate 96. It is to be noted in this respect that such sliding movement of the spring unit 56 with respect to the beam 84 on the wear plate 96, is made possible by virtue of the independent swinging movement of the unit 56 and the beam 84 about a common horizontal axis of stub shafts 64 and 66.

In the embodiment of my invention shown by Figs. 8 to 10 inclusive, front undercarriage 216 and rear undercarriage 218 are essentially the same as undercarriages 16 and 18 respectively and, therefore, except only for the differences hereinafter set forth, the construction and operation of undercarriages 216 and 218 will not be repeated.

The differences relate primarily to the interconnection between beam 284 of rear undercarriage 218, and tie bar 246 of the front undercarriage 216, together with the manner of connecting the tie bar 246 to the rearmost ends of front springs 228 and 230 so as to permit reciprocable movement of the tie beam 284 relative to springs 228—230 in a fore and aft direction, as well as swinging movement about the vertical axis of a pintle 206.

As seen in Fig. 10, the beam 284 is provided with a forwardly extending, tubular section 298 that extends through openings 200 formed in the tie bar 246 intermediate the ends thereof. The pintle 206 pivotally interconnects the relatively intersecting tie beam 284 and tie bar 246.

Tie bar 246 is provided with upstanding ears 249 adjacent the outermost ends thereof receiving shackles 253 therebetween which are swingably attached to the ears 249 by bolts 255. The uppermost ends of the shackles or links 253 receive the rearmost ends of the springs 228 and 230 which are coupled therewith by pintles 248.

Consequently, in the embodiment of Figs. 8 to 10 inclusive, while a sliding pivotal connection between the beam 284 and the bar 246 has been entirely eliminated with beam 284 limited entirely to swinging movement with respect to the bar 246 on the vertical axis of pin 206, the beam 284 nevertheless has fore and aft movement as it swings about the pin 206 because of the swinging movement of bar 246 with respect to the springs 228 and 230 about the horizontal axes of the bolts 248 and 255.

In all other respects the embodiment of Figs. 8 to 10 inclusive operates in the same manner as the modification of Figs. 1 to 7 inclusive and with equally satisfactory results. The undercarriages 216 and 218 are permitted to swing about the vertical axes 238 and 272 of their corresponding fifth wheel mounting structures 212 and 214 respectively; springs 228 and 230 may swing, not only at the rearmost ends thereof as just above explained, but with respect to the structure 212 about the horizontal axes of pintles 244; the relatively diverging rear springs 258 and 260 may slide fore and aft on wear plate 296 of beam 284;

and the springs 258—260 may swing on a common horizontal axis with the beam 284 or relative thereto by virtue of stub shafts comparable to shafts 64 and 66, one only of which is shown in Fig. 9 of the drawings and designated by the numeral 266.

Having thus described the invention what is claimed as new and desired to be secured by Letters Patent is:

1. In a mobile vehicle, a front and a rear undercarriage, each provided with a wheel-axle assembly and a spring unit operably connected with the axle thereof; a fifth wheel mounting structure pivotally attached to each spring unit respectively for movement about a horizontal axis and each including a load carrying frame pivotally attached thereto for movement about a vertical axis; and means pivotally coupling the forwardmost end of the spring unit of said rear undercarriage with the rearmost end of the spring unit of said front undercarriage.

2. In a mobile vehicle, a front and a rear undercarriage, each provided with a wheel-axle assembly and a spring unit operably connected with the axle thereof; a fifth wheel mounting structure pivotally attached to each spring unit respectively for movement about a horizontal axis and each including a load carrying frame pivotally attached thereto for movement about a vertical axis; a transverse tie bar carried by the spring unit of said front undercarriage; a longitudinal tie beam extending forwardly from the spring unit of said rear undercarriage; and means pivotally coupling said tie beam with said tie bar.

3. In a mobile vehicle, a front and a rear undercarriage, each provided with a wheel-axle assembly and a spring unit operably connected with the axle thereof; a fifth wheel mounting structure pivotally attached to each spring unit respectively for movement about a horizontal axis and each including a load carrying frame pivotally attached thereto for movement about a vertical axis; a longitudinal tie beam extending forwardly from the spring unit of said rear undercarriage; and means coupling the tie beam with the rearmost end of the spring unit of said front undercarriage for fore and aft movement and for swinging movement about a substantially vertical axis.

4. In a mobile vehicle, a front and a rear undercarriage, each provided with a wheel-axle assembly and a spring unit operably connected with the axle thereof; a fifth wheel mounting structure for each spring unit respectively; means for each spring unit respectively pivotally attaching the same to the corresponding structures thereof for swinging movement about substantially horizontal axes; a load carrying frame pivotally attached to each structure respectively for movement about a vertical axis; and means pivotally coupling the forwardmost end of the spring unit of said rear undercarriage with the rearmost end of the spring unit of said front undercarriage.

5. In a mobile vehicle, a front and a rear axle each provided with a pair of ground-engaging wheels; a front spring unit fixed intermediate the ends thereof to the front axle; a front fifth wheel mounting structure pivotally attached to the forwardmost end of the front spring unit for movement about a horizontal axis; a rear spring unit fixed at the rearmost end thereof to said rear axle; a rear fifth wheel mounting structure pivotally attached to the rear spring unit intermediate the ends of the latter for movement about a horizontal axis; a load carrying frame pivotally attached to each structure respectively for movement about a vertical axis; a longitudinal tie beam extending forwardly from the forwardmost end of the rear spring unit; and means pivotally coupling the tie beam with the front spring unit at the rearmost end of the latter.

6. In a mobile vehicle, a front and a rear axle each provided with a pair of ground-engaging wheels; a front spring unit fixed intermediate the ends thereof to the front axle; a front fifth wheel mounting structure pivotally attached to the forwardmost end of the front spring unit; a rear spring unit fixed at the rearmost end thereof to said rear axle; a rear fifth wheel mounting structure pivotally attached to the rear spring unit intermediate the ends of the latter; a longitudinal tie beam pivotally connected with the rear fifth wheel mounting structure and slidably supporting the forwardmost end of the rear spring unit; and means pivotally coupling the tie beam with the front spring unit at the rearmost end of the latter.

7. In a mobile vehicle as set forth in claim 6 wherein said beam and said rear spring unit swing about a common horizontal axis relative to the rear fifth wheel mounting structure.

8. In a mobile vehicle as set forth in claim 7 wherein said axis is normally in substantial parallelism with the axles, and with the axes of pivotal movement of the front spring unit relative to the beam and to the front fifth wheel mounting structure.

9. In a mobile vehicle as set forth in claim 8 wherein said beam is swingable about a substantially vertical axis relative to the front spring unit.

10. In a mobile vehicle as set forth in claim 9 wherein said beam is shiftable fore and aft relative to the front spring unit.

11. In a mobile vehicle as set forth in claim 6 wherein is provided a transverse tie bar at the rearmost end of the front spring unit, said beam being secured to the bar for swinging movement on a substantially vertical axis.

12. In a mobile vehicle as set forth in claim 11 wherein said beam is reciprocable fore and aft relative to the bar.

13. In a mobile vehicle as set forth in claim 11 wherein said bar is swingable about a substantially horizontal axis relative to the front spring unit.

14. In a mobile vehicle as set forth in claim 7 wherein is provided a transverse tie bar depending from the front spring unit and swingable fore and aft relative thereto and wherein the beam is pivotally secured to the tie bar intermediate the ends of the latter.

References Cited in the file of this patent

UNITED STATES PATENTS

| | | |
|---|---|---|
| 1,881,070 | Falk | Oct. 4, 1932 |
| 2,373,398 | Hoobler | Apr. 10, 1945 |